United States Patent Office 2,861,975
Patented Nov. 25, 1958

2,861,975

ANTIOZIDATION OF RUBBER WITH CERTAIN ALKYLAMINOQUINOLINES

Ralph B. Thompson, Hinsdale, Ill., assignor to Universal Oil Products Company, Des Plaines, Ill., a corporation of Delaware No Drawing. Application October 10, 1955
Serial No. 539,656

11 Claims. (Cl. 260—45.8)

This invention relates to the antiozidation of rubber, and more particularly to a novel method of retarding the cracking of rubber due to ozone.

It is only comparatively recently that the cracking of rubber has been recognized as being caused by ozone. This recognition came particularly as a result of the military being unable to use in the Korean War vehicles which were stored after World War II because of deterioration of the rubber tires and other rubber products. As a result of this, an intensive investigation was conducted, and the deterioration of the rubber materials was found to be due to ozone. Deterioration of rubber by ozone is a surface reaction and results in cracking of the rubber. On the other hand, deterioration of rubber due to oxidative deterioration results primarily in stiffening of the rubber and loss of elasticity. Therefore, the deterioration due to ozone is different from the deterioration due to oxygen, not only in the type of deterioration products but also in the mechanism of deterioration. Furthermore, protection from ozone requires the use of considerably larger concentrations of additive than is required to retard oxidative deterioration. Most antioxidants either are ineffective as antiozidants or promote oxidation in the large concentrations required for antiozidation purposes or cannot be used commercially for other reasons.

The stabilization of rubber presents problems which are different from those encountered with other substrates as, for example, hydrocarbon distillates. First, the additive must not be too toxic or possess sensitivity properties which will prove harmful when used in rubber which contacts food products or which will prove to be a hazard when handled by men working with the rubber products. In addition to possessing high potency to retard ozone cracking, a satisfactory additive must possess the desired volatility so that it will not be lost during compounding or in use at high temperatures.

In one embodiment the present invention relates to a method of preventing the cracking of rubber due to ozone which comprises incorporating therein an antiozidative concentration of an aminoquinoline.

In a specific embodiment the present invention relates to a method of preventing the cracking of GR–S rubber due to ozone which comprises incorporating in said rubber an antiozidative concentration of 6-isopropylaminoquinoline.

In still another embodiment the present invention relates to rubber stabilized against cracking due to ozone containing an antiozidant as herein set forth.

The present invention is utilized for the stabilization of any rubber subject to cracking due to ozone, including both synthetic and natural rubber. Most of the synthetic rubber now being produced commercially as GR–S rubber which is a copolymer of butadiene and styrene. Other synthetic rubbers include those produced from butadiene and acrylonitrile (Buna–N), butadiene and isobutylene (butyl rubber), etc. Still other synthetic rubbers include thiokol rubber, silicone rubber, neoprene rubber, etc. Natural rubber is regarded as comprising naturally occurring isoprene polymers. The natural rubbers include Hevea, caoutchouc, balata, gutta percha, etc.

In accordance with the present invention, cracking of rubber due to ozone is retarded by incorporating therein an aminoquinoline, and particularly an alkylaminoquinoline. As will be shown by the appended examples, these additives are very effective antiozidants. This is surprising in view of the fact that the aminoquinolines do not contain a free hydrogen attached to the heterocyclic nitrogen atom. Past experience has demonstrated that in general an effective additive should contain an available hydrogen attached to a polar component of the additive compound. Therefore, it is unexpected that the aminoquinolines are effective at all as antiozidants and more so surprising that they proved to be so exceptionally effective for this purpose.

Any suitable aminoquinolines may be used in accordance with the present invention, and particularly aminoquinolines containing the amino substituent on the phenyl ring other than the one containing the heterocyclic nitrogen. Illustrative aminoquinolines include 5-aminoquinoline, 6-aminoquinoline, 7-aminoquinoline and 8-aminoquinoline. During the preparation of these compounds, a mixture may be used in accordance with the present a mixture of these aminoquinolines may be obtained, and such a mixture may be used in accordance with the present invention. Thus, the product may comprise a mixture of 5-aminoquinoline and 8-aminoquinoline. In still another embodiment, a diaminoquinoline or a mixture of diaminoquinolines may be employed.

A particularly preferred aminoquinoline for use in the present invention comprises an alkylaminoquinoline. In one embodiment, the alkylaminoquinoline preferably comprises a 6-alkylaminoquinoline. In a still more specific embodiment, the 6-alkyl substituent preferably is a secondary alkyl group; that is, the alkyl radical is attached to the nitrogen atom at an intermediate carbon atom of the alkyl group. Illustrative additives of this class include 6 - isopropylaminoquinoline, 6 - sec - butylaminoquinoline, 6-sec-amylaminoquinoline, 6-sec-hexylaminoquinoline, 6-sec-heptylaminoquinoline, 6-sec-octylaminoquinoline, 6-sec-nonylaminoquinoline, 6-sec-decylaminoquinoline, 6-sec-undecylaminoquinoline, 6-sec-dodecylaminoquinoline, 6 - sec - tridecylaminoquinoline, 6-sec-tetradecylaminoquinoline, 6-sec-pentadecylaminoquinoline, 6 - sec - hexadecylaminoquinoline, 6 - sec - heptadecylaminoquinoline, 6 - sec - octadecylaminoquinoline, 6 - sec - nonadecylaminoquinoline, 6 - sec - eicosylaminoquinoline, etc. Other alkylaminoquinolines which are used in the present invention include 5 - alkylaminoquinolines, 7 - alkylaminoquinolines and 8 - alkylaminoquinolines. The alkyl substituent preferably is selected from those herein set forth.

During the preparation of the alkylaminoquinolines, a mixture of compounds may be obtained and such mixture may be used in the present invention, thereby avoiding the additional expense of further separating the product. Such mixtures include particularly a mixture of 5-alkylaminoquinolines and 8-alkylaminoquinolines. Illustrative examples comprise a mixture of 5-isopropylaminoquinoline and 8-isopropylaminoquinoline, a mixture of 5-sec-butylaminoquinoline and 8-sec-butylaminoquinoline, a mixture of 5-sec-amylaminoquinoline and 8-sec-amylaminoquinoline, a mixture of 5-sec-hexylaminoquinoline and 8-sec-hexylaminoquinoline, a mixture of 5-sec-heptylaminoquinoline and 8-sec-heptylaminoquinoline, a mixture of 5-sec-octylaminoquinoline and 8-sec-octylaminoquinoline, a mixture of 5-sec-nonylaminoquinoline and 8-sec-nonylaminoquinoline, a mixture of 5-sec-decylaminoquinoline and 8-secdecylaminoquinoline, a mixture of 5-sec-undecylaminoquinoline and 8-sec-undecylaminoquinoline, a mixture of 5-sec-dodecylaminoquinoline and 8-sec-dodecylaminoquinoline, etc. Other mixtures include a mixture of 5-alkylaminoquinolines and 6-alkylaminoquinolines, a mixture of 5-alkylaminoquinolines and 7-alkylaminoquinolines, and a mixture of 6-alkylaminoquinolines and 7-alkylaminoquinolines. The alkyl substituents preferably are selected from those specifically herein set forth.

In still another embodiment, the antioxidant comprises a dialkylaminoquinoline. Illustrative compounds in this class include 6-di-isopropylaminoquinoline, 6-di-sec-butylaminoquinoline, 6-di-sec-amylaminoquinoline, 6-di-sec-hexylaminoquinoline, 6-di-sec-heptylaminoquinoline, 6-di-sec-octylaminoquinoline, 6-di-sec-nonylaminoquinoline, 6-di-sec-decylaminoquinoline, 6-di-sec-undecylaminoquinoline, 6-di-sec-dodecylaminoquinoline, etc., 5-di-isopropylaminoquinoline, 5-di-sec-butylaminoquinoline, 5-di-sec-amylaminoquinoline, 5 - di - sec - hexylaminoquinoline, 5-di-sec-heptylaminoquinoline, 5-di-sec-octylaminoquinoline, etc., 7-di-isopropylaminoquinoline, 7-di-sec-butylaminoquinoline, 7-di-sec-amylaminoquinoline, 7-di-sec-hexylaminoquinoline, 7 - di- sec - heptylaminoquinoline, 7-di-sec-octylaminoquinoline, etc., 8-di-isopropylaminoquinoline, 8-di-sec-butylaminoquinoline, 8-di-sec-amylaminoquinoline, 8-di-sec-hexylaminoquinoline, 8-di-sec-heptylaminoquinoline, 8-di-sec-octylaminoquinoline, etc.

In still another embodiment, the antioxidant comprises a di-(alkylamino)-quinoline. Illustrative examples in this class include 5,8-di-(isopropylamino)-quinoline, 5,8-di-(sec-butylamino)-quinoline, 5,8-di-(sec-amylamino)-quinoline, 5,8-di-(sec-hexylamino)-quinoline, 5,8-di-(sec - heptylamino) - quinoline, 5,8 - di - (sec - octylamino)-quinoline, etc., 5,6-di-(isopropylamino)-quinoline, 5,6-di-(sec-butylamino)-quinoline, 5,6-di-(sec-amylamino)-quinoline, 5,6-di-(sec-hexylamino)-quinoline, 5,6-di-(sec - heptylamino) - quinoline, 5,6 - di - (sec - octylamino)-quinoline, etc., 6,7-di-(isopropylamino)-quinoline, 6,7-di-(sec-butylamino)-quinoline, 6,7-di-(sec-amylamino)-quinoline, 6,7-di-(sec-hexylamino)-quinoline, 6,7-di-(sec - heptylamino) - quinoline, 6,7 - di - (sec - octylamino)-quinoline, etc.

While it is preferred that the alkyl substituent is of secondary configuration, in some cases the alkyl group may be a primary substituent; that is, the alkyl group is attached at a terminal carbon atom thereof to the nitrogen atom. It is understood that the alkyl substituent, whether of secondary or primary configuration, also may be straight chain or may contain branching in the chain. In some cases, tertiary alkyl groups may be employed.

The antiozidant for use in the present invention is prepared in any suitable manner. For example, 6-isopropylaminoquinoline is prepared by the reductive alkylation of 6-nitroquinoline with acetone in the presence of hydrogen and a reductive alkylation catalyst. 6-sec-octylaminoquinoline is prepared by the reductive alkylation of 6-nitroquinoline with methyl hexyl ketone. A mixture of 5-alkylaminoquinoline and 8-alkylaminoquinoline is prepared by nitrating quinoline with nitric acid in the presence of sulfuric acid to obtain a mixture of 5-nitroquinoline and 8-nitroquinoline. The resultant mixture is subjected to reductive alkylation with the desired aldehyde or ketone to form the mixture of 5-alkylaminoquinoline and 8-alkylaminoquinoline. As hereinbefore set forth, this mixture may be used as such and thereby save the cost of separating the product. However, when the individual compounds are desired, the nitro derivatives may be separated by crystallization and then one or both of the nitro derivatives is separately subjected to reductive alkylation.

From the above description, it will be noted that a number of different compounds may be prepared and used in accordance with the present invention. These different additives which may be used in the present invention are generally referred to in the present specifications and claims as "aminoquinolines." However, it is understood that these compounds are not necessarily of equivalent potency. The specific additive to be used will depend upon the availability and/or cost of preparation and also upon effectiveness in the particular rubber to be stabilized. It is understood that a mixture of compounds may be employed, the specific compounds preferably being selected from those hereinbefore set forth.

The antiozidant of the present invention is utilized in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the antiozidant of the present invention can be used in reclaims and latices of rubbery materials, whether or not admixed with fillers, pigments, accelerating agents, etc. In another embodiment the present invention can be utilized for the stabilization of adhesives, elastomers, etc. which tend to crack due to ozone.

The antiozidant is utilized in a small but sufficient concentration to retard ozone cracking. In general, this antioxidative concentration will be within the range of from about 0.25% to about 10% by weight of the rubber hydrocarbon and preferably in a concentration of from about 1% to about 5% by weight thereof. These concentrations are based on the rubber hydrocarbon, exclusive of the other components of the final rubber composition, and are used in this manner in the present specifications and claims. It is understood that the antiozidant of the present invention is utilizable along with other additives incorporated in rubber for specific purposes including, for example, antioxidants, accelerators, softeners, extenders, wax, reinforcing agents, etc.

The antiozidant of the present invention normally is employed along with certain commercial antioxidants which are incorporated in the latex prior to milling with the other components of the rubber. In this embodiment, the antiozidant of the present invention thus is used along with a separate antioxidant. Any suitable antioxidant may be employed including, for example, phenyl-beta-naphthylamine, 6-phenyl-2,2,4-trimethyl-1,2-dihydroquinoline, marketed under the trade name of "Santoflex-B," 2,2' - methylene - bis - (4 - methyl - 6 - tert - butylphenol), 2,6-di-tert-butyl-p-cresol, the reaction product of acetone and diphenylamine, marketed under the trade name of "B. L. E.," etc. These antioxidants generally are used in a concentration of from about 0.5% to about 3% by weight of the rubber.

The antiozidant of the present invention also normally is employed along with paraffin and/or microcrystalline wax. The wax generally is utilized in a concentration of from about 0.5% to about 3% by weight of the rubber.

In one embodiment, the antiozidant of the present invention is admixed with the antioxidant and/or wax, and the mixture then is composited with one or more of the other components of the rubber composition.

The antiozidant of the present invention is incorporated in rubber or rubbery products in any suitable manner and at any suitable stage of preparation, preferably prior to milling and vulcanization of the rubber composition. When the antiozidant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

The following examples are introduced to illustrate further the novelty and utility of the present invention but not with the intention of unduly limiting the same.

*Example I*

The data reported in this example were obtained from a sample of GR-S black rubber stock being manufactured by one of the rubber companies and marketed for commercial use. The rubber was cut into strips. In the sample containing additive, the additive was incorporated by immersing and swelling the sample in a solution containing the additive and toluene as a solvent. The concentration of additive was selected to leave in the rubber sample, after the toluene had been removed, a concentration of additive of about 2.6 parts by weight per 100 parts by weight of rubber hydrocarbon. After evaporation of the toluene, the sample was cooled, elongated 20% and mounted on a waxed wooden panel, along with a control sample of the rubber (sample not containing the additive). The samples then were exposed in an ozone cabinet to air containing about 50 parts of ozone per 100 million parts of air at a temperature of about 38° C.

The additive used in this example was 6-isopropylaminoquinoline. This compound had a boiling point of 116–120° C. at 3 mm. pressure. The sample containing 6-isopropylaminoquinoline did not show visible cracks even after 336 hours in the ozone cabinet. The run was discontinued at this time because the additive was definitely shown to be of exceptionally high potency. On the other hand, the control sample (not containing this additive) began to show visible cracks after two hours exposure in the ozone cabinet.

From the above data, it will be noted that 6-isopropylaminoquinoline was of exceptional potency in retarding cracking of the rubber. As hereinbefore set forth, this result is indeed surprising.

*Example II*

The additive used in this example was a mixture of 5-sec-octylaminoquinoline and 8-sec-octylaminoquinoline. This mixture had a boiling point of 150–163° C. at 3 mm. pressure. This mixture was incorporated in a concentration of about 2.6 parts by weight in another sample of the GR-S rubber by immersing and swelling in a solution of toluene in the manner described in Example I. After exposure in the ozone cabinet in the same manner as described in Example I, the sample containing the mixture did not show visible cracks for about 60 hours. On the other hand, the control sample (not containing this additive) began to show visible cracks after two hours exposure in the ozone cabinet.

From the data in this example, it will be noted that the mixture of 5-octylaminoquinoline and 8-octylaminoquinoline also served to retard cracking of the rubber to a considerable extent.

*Example III*

The additive used in this example was 6-sec-octylaminoquinoline. This additive had a boiling point of 160–180° C. at 0.6 mm. pressure. When incorporated in another sample of the GR-S rubber in the same manner as described in Example I, this additive served to retard cracking of the rubber for about 60 hours, in contrast to the appearance of visible cracks in the control sample after two hours.

*Example IV*

The additive used in this example is 6-aminoquinoline. This additive had a boiling point of 144–145° C. at 0.5 mm. pressure and a melting point of 114–116° C. It is incorporated in natural rubber by being commingled with the latex prior to vulcanization. This serves to retard cracking of the rubber due to ozone.

I claim as my invention:

1. Synthetic rubber comprising a copolymer of butadiene and styrene containing from about 0.25% to about 10% by weight of 6-isopropylaminoquinoline.

2. Synthetic rubber comprising a copolymer of butadiene and styrene containing from about 0.25% to about 10% by weight of 6-sec-octylaminoquinoline.

3. Synthetic rubber comprising a copolymer of butadiene and styrene containing from about 0.25% to about 10% by weight of 5-octylaminoquinoline.

4. Synthetic rubber comprising a copolymer of butadiene and styrene containing from about 0.25% to about 10% by weight of 8-sec-octylaminoquinoline.

5. Synthetic rubber comprising a copolymer of butadiene and styrene containing from about 0.25% to about 10% by weight of a mixture of 5-sec-octylaminoquinoline and 8-sec-octylaminoquinoline.

6. A rubber selected from the group consisting of natural rubber, butadiene-styrene copolymer, butadiene-acrylonitrile copolymer, butadiene-isobutylene copolymer, thiokol rubber, silicone rubber and neoprene rubber containing from about 0.25% to about 10% by weight of an antiozidant selected from the group consisting of 5-alkylaminoquinolines, 6-alkylaminoquinolines, 7-alkylaminoquinolines, and 8-alkylaminoquinolines having an alkyl group of from 3 to 20 carbon atoms.

7. A rubber selected from the group consisting of natural rubber, butadiene-styrene copolymer, butadiene-acrylonitrile copolymer, butadiene-isobutylene copolymer, thiokol rubber, silicone rubber and neoprene rubber, containing from about 0.25% to about 10% by weight of 6-isopropylaminoquinoline.

8. A composition as defined in claim 6 further characterized in that the rubber is a copolymer of butadiene and styrene.

9. A composition as defined in claim 6 further characterized in that the antiozidant is 6-octylaminoquinoline.

10. A composition as defined in claim 6 further characterized in that the antiozidant is 5-octylaminoquinoline.

11. A composition as defined in claim 6 further characterized in that the antiozidant is 8-octylaminoquinoline.

References Cited in the file of this patent

UNITED STATES PATENTS 2,713,047    Beaver et al. _____ July 12, 1955